Patented Aug. 4, 1931

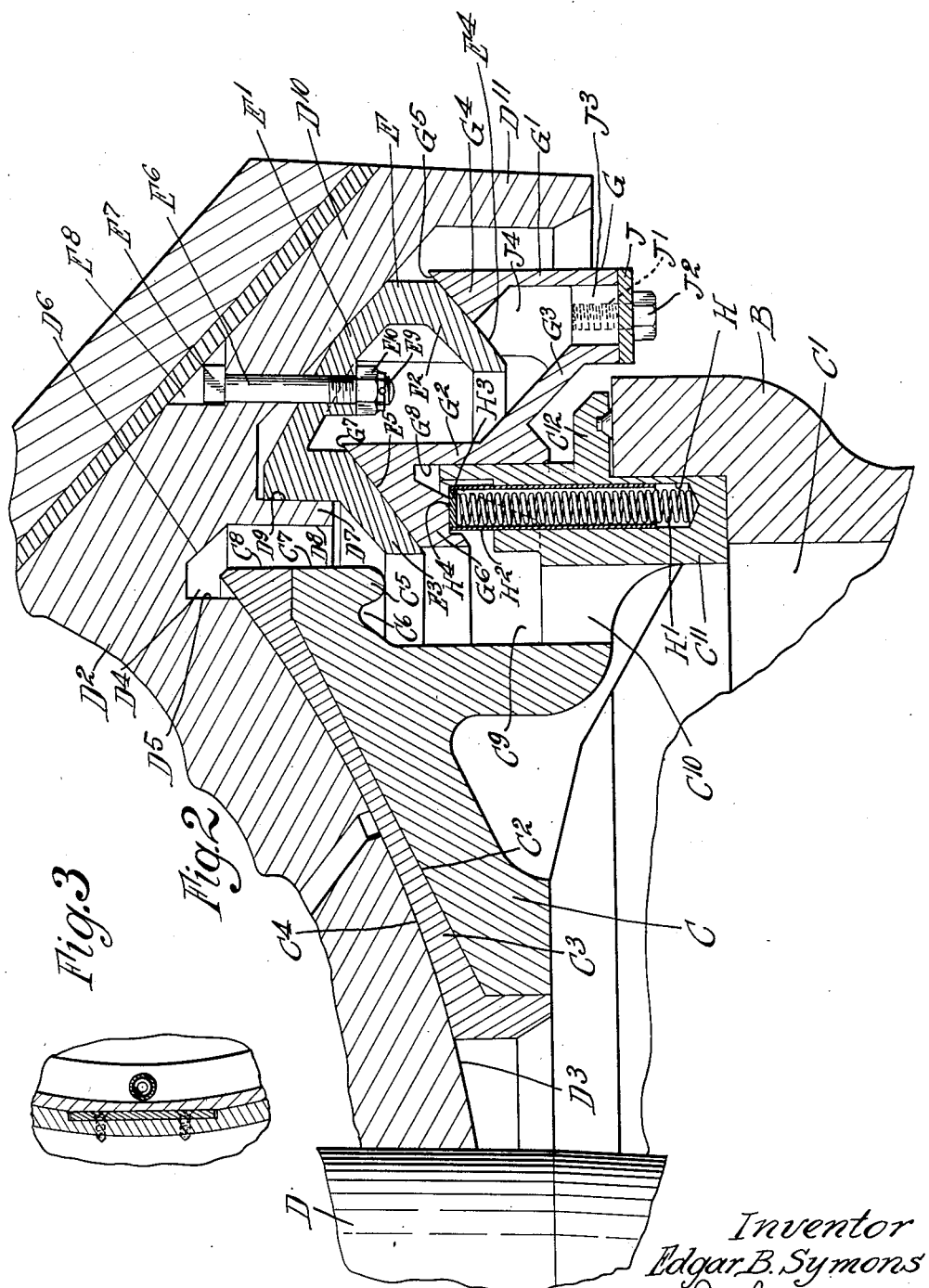

1,817,044

UNITED STATES PATENT OFFICE

EDGAR B. SYMONS, OF HOLLYWOOD, CALIFORNIA, ASSIGNOR TO NORDBERG MANUFACTURING COMPANY, OF MILWAUKEE, WISCONSIN, A CORPORATION OF WISCONSIN

CRUSHING MACHINE

Application filed May 10, 1929. Serial No. 361,907.

My invention relates to gyratory cone crushers of the type in which a cone or conical head is gyrated. A particular application of my invention is a machine in which the gyrated head is seated upon and supported on a concave spherical bearing surface the lower portion of the head being spherically convex in general conformity to the supporting surface. One object of my invention is to prevent the access of dust or dirt to such a bearing. Another object is the provision of removable and renewable means and elements for preventing the access of dust to such a bearing. Other objects will appear from time to time in the course of the specification and claims.

I illustrate my invention more or less diagrammatically in the accompanying drawings, wherein—

Figure 2 is an enlarged detail section; and

Figure 3 is a section along the line 3—3 of Figure 1.

Like parts are indicated by like symbols throughout the specification and drawings.

Figure 1:
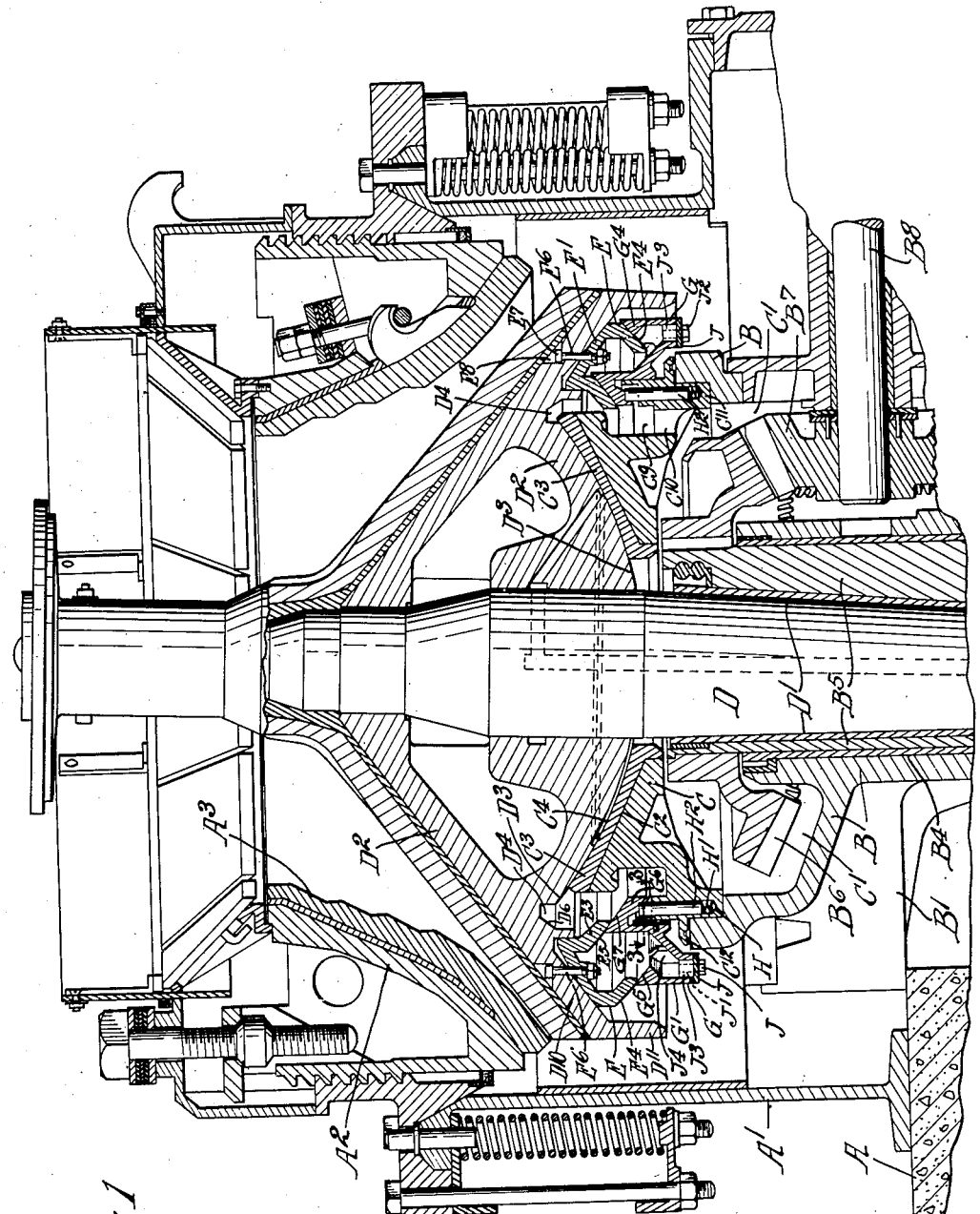
Figure 1 is a vertical axial section through a gyratory crusher.

Referring to the drawings, A indicates a bed upon which rests a frame $A^1$ upon which is supported in any suitable manner the bowl or concave $A^2$ provided with a liner $A^3$.

Positioned within the main frame member $A^1$ is the rigid bearing sleeve B which may be connected to the outer frame member as by the radial arms or connecting elements $B^1$. The cylindrical inner aperture of the sleeve B receives a liner or bearing $B^4$. Mounted for rotation with it is the eccentric sleeve $B^5$ which may be driven through the gear $B^6$ as for example by the pinion $B^7$, on the shaft $B^8$, and any suitable driving means.

C indicates a bearing cap positioned at the upper end of the sleeve B and adapted to serve as a closure also for the gear box or space $C^1$. It is provided with the concave conical upper surface $C^2$ adapted to receive the actual bearing member $C^3$ with its true spherical bearing surface $C^4$. The upper edge of the member C terminates in the overhanging flange or trip member $C^5$ which is undercut or recessed as at $C^6$ and terminates in an outer peripheral generally vertical surface $C^7$ and continues with a corresponding surface $C^8$ about the outer edge of the member $C^3$. $C^9$ generally indicates a circumferential oil well or sump which communicates, as by the passage $C^{10}$, with the gear box $C^1$. The member C is continued, exteriorly of said sump $C^9$ by a portion $C^{11}$ and a lateral outer extension $C^{12}$ therefrom, the members $C^{11}$ $C^{12}$ conforming to the upper edge of the expanded end of the sleeve B, as shown.

D indicates a crusher shaft, penetrating the eccentric aperture $D^1$ in the eccentric sleeve $B^5$. Mounted at the upper end of the shaft D is a conic head generally indicated as $D^2$, which is provided with a convex spherical surface $D^3$ opposed to the corresponding concave spherical surface $C^4$ of the member $C^3$. This spherical surface terminates in the upwardly recessed channel $D^4$ with its vertical inner wall $D^5$ and its inclined outer wall $D^6$. Exterior of this wall $D^6$ is the depending circumferential flange $D^7$ bounded by an inner generally vertical wall $D^8$ and an outer wall $D^9$ preferably parallel thereto. $D^{10}$ indicates an extension of the cone or head outwardly beyond the flange $D^7$, the extension $D^{10}$ terminating in a downwardly turned apron $D^{11}$.

E generally indicates a dust guard or oil wiping member which includes an intermediate portion $E^1$, an outer flange $E^2$ and an inner flange $E^3$. The outer flange $E^2$ is provided with the spherical bearing surface $E^4$ and the inner flange a spherical bearing surface $E^5$, these surfaces being preferably concentric with the bearing surfaces $C^4$ and $D^3$. The member E is secured to the cone as by the bolts $E^6$ the heads of which $E^7$ may seat in recesses $E^8$ in the exterior of the cone. The lower ends of the bolts, screw-threaded as at $E^9$, receive any suitable nuts or lock nuts $E^{10}$, such nuts being positioned in the space between the flanges $E^2$ and $E^3$, said space being entirely enclosed, as will later appear. The head $E^7$ and the aperture $E^8$ may be of such form as to prevent rotation of the bolt $E^6$, whereby its loosening is rendered unlikely or impossible, or the aperture $E^8$ may be filled, as with white metal, to render the bolt immovable.

G generally indicates a wiping and dust closure member which includes an outer wall $G^1$, an inner wall $G^2$ and a connecting inclined wall $G^3$. The outer wall $G^1$ is shown as generally vertical. It is provided with an upward extension or enlargement or thickening $G^4$ which includes the spherical surface $G^5$ opposed to the surface $E^4$ of the flange $E^2$. The wall $G^2$ is expanded and inwardly extended at its upper end as at $G^6$ and is provided with a spherical bearing surface $G^7$ opposed to the corresponding surface $E^5$ on the flange $E^3$. Note that $G^2$ is provided with an inner cylindrical wall $G^8$ opposed to a corresponding exterior wall of the member $C^{11}$ preferably snugly, the fit, however, being insufficiently tight to prevent the spring $H^1$ from raising the dust guard into contact with the spherical surfaces $E^4$ and $E^5$.

The member G is upwardly thrust against the member E, in such fashion that both sets of spherically opposed bearings are kept in intimate contact. As means for maintaining such a constant upward thrust I indicate the apertures H in the member $C^{11}$ which receive the compression springs $H^1$, these springs being housed within the cylinders $H^2$ and the upper heads thereof $H^3$, these cylinders being upwardly thrust against the portion $G^6$ of the member G, such portion being recessed to receive the upper heads of the cylinders, as at $H^4$. Intermediate the lower ends of the walls $G^3$ and $G^1$ I provide a closure plate, indicated as J, which may be made in segments. It may be secured in position, as by the screws $J^1$, with their heads $J^2$, the screws penetrating the ribs $J^3$ which connect the walls $G^1$ $G^3$. As further strengthening I may employ the full ribs $J^4$ extending between the members $G^1$ $G^3$.

Since under many circumstances it is found desirable to prevent rotation of the wiping means or member G I provide, as an example, a flat key K which registers with the flattened portion $K^1$ of the ring $C^{11}$. However, I do not wish to be limited to this particular means of preventing rotation of the ring and I do not wish to be limited to the use with the wiping ring or dust guard G of rotation prevention means, because under some circumstances it may be possible to dispense with such means.

It will be realized that whereas I have described and shown a practical and operative device, nevertheless many changes might be made in the size, shape, number and disposition of parts without departing from the spirit of my invention. I therefore wish my description and showing to be taken as in a broad sense illustrative and diagrammatic rather than as limiting me to my specific showing.

I claim:

1. In a gyratory crusher including a cone having a downwardly convex spherical bearing surface, a bearing member having an upwardly concave spherical bearing surface conforming thereto, and a plurality of concentric wiping members surrounding and spaced from the bearing member, each having a spherical surface concentric with the main bearing surface, and means for thrusting said wiping members upwardly against the cone, the cone being formed for bearing engagement therewith.

2. In a gyratory crusher including a cone having a downwardly convex spherical bearing surface, a bearing member having an upwardly concave spherical bearing surface conforming thereto, and a plurality of concentric wiping members surrounding and spaced from the bearing member, each having a spherical surface concentric with the main bearing surface, and yielding means for thrusting said wiping members upwardly against the cone, the cone being formed for bearing engagement therewith.

3. In a gyratory crusher including a cone having a downwardly convex spherical bearing surface, a bearing member having an upwardly concave spherical bearing surface conforming thereto, and a plurality of concentric wiping members surrounding and spaced from the bearing member, each having a spherical surface concentric with the main bearing surface, and yielding means for maintaining a contact between said wiping member and the cone, the cone being formed for bearing engagement therewith.

4. In a gyratory crusher including a cone having a downwardly convex spherical bearing surface, a bearing member having an upwardly concave spherical bearing surface conforming thereto, and a plurality of concentric wiping members surrounding and spaced from the bearing member, each having a spherical surface concentric with the main bearing surface, the cone being formed for bearing engagement therewith, and yielding means for unitarily thrusting all of said concentric wiping members upwardly against the cone.

5. In a gyratory crusher, a bearing member having an upwardly concave spherical bearing surface, and a plurality of wiping members surrounding it and spaced therefrom, each having a spherical surface concentric with the main bearing surface, and a dust chamber formed intermediate said wiping members.

6. In a gyratory crusher, a bearing member having an upwardly concave spherical bearing surface, and a plurality of wiping members surrounding it and spaced therefrom, each having a spherical surface concentric with the main bearing surface, and a dust chamber formed intermediate said wiping members, and means for permitting the removal of dust from said chamber.

7. In a gyratory crusher, a bearing member having an upwardly concave spherical bearing surface, and a plurality of wiping members surrounding it and spaced therefrom, each having a spherical surface concentric with the main bearing surface, and a dust chamber formed intermediate said wiping members, and means for permitting the removal of dust from said chamber, including a closure for said dust chamber.

8. In a gyratory crusher, a bearing member having an upwardly concave spherical bearing surface and a plurality of wiping members surrounding it and spaced therefrom, and a dust chamber formed intermediate said wiping members.

9. In a gyratory crusher, a bearing member having an upwardly concave spherical bearing surface and a plurality of wiping members surrounding it and spaced therefrom, and a dust chamber formed intermediate said wiping members and means for permitting removal of dust from said chamber.

10. In a gyratory crusher including a cone having a downwardly convex spherical bearing surface, a bearing member having an upwardly convex spherical bearing surface, a wiping member, concentric therewith and exterior thereto, mounted removably upon the cone and an opposed wiping member movably mounted about the bearing surface.

11. In a gyratory crusher including a cone having a downwardly convex spherical bearing surface, a bearing member having an upwardly convex spherical bearing surface, a wiping member, concentric therewith and exterior thereto, mounted removably upon the cone and an opposed wiping member movably mounted about the bearing surface, the two wiping members each including a plurality of spherical wiping surfaces concentric with the spherical bearing surface of the cone.

12. In a gyratory crusher including a cone having a downwardly convex spherical bearing surface, a bearing member having an upwardly convex spherical bearing surface, a wiping member, concentric therewith and exterior thereto, mounted removably upon the cone and an opposed wiping member movably mounted about the bearing surface, the two wiping members each including a plurality of spherical wiping surfaces concentric with the spherical bearing surface of the cone, the lower wiping member being formed with a dust chamber intermediate said spherical wiping surfaces.

13. In a gyratory crusher, a bearing member having an upwardly concave spherical bearing surface, a crushing cone mounted on said bearing member and having a bearing portion conforming thereto, a wiping member exterior to said main bearing member and yielding means adapted normally to maintain a sealing contact between the wiping member and the cone, and means for holding said wiping member against rotation.

14. The structure of claim 13 characterized by the employment of a key for preventing rotation of said wiping member.

15. In a gyratory crusher, a bearing member having an upwardly concave spherical bearing surface, a crushing cone mounted on said bearing member and having a bearing portion conforming thereto, a wiping member exterior to said main bearing member, and yielding means adapted normally to thrust said wiping member, into sealing contact, upwardly against the cone, and means for holding said wiping member against rotation.

16. In a gyratory crusher, a supporting frame, a bearing member supported on said frame and having an upwardly concave spherical bearing surface, a crushing head opposed thereto, having a downwardly convex spherical bearing surface adapted for bearing contact with the opposed concave surface, means for gyrating the head, and means for preventing the access of dust to the opposed bearing surfaces, said means including a plurality of wiping connections exterior to the peripheries of the opposed bearing surfaces, each such connection including a member associated with the frame and a member associated with the head, an oil sump intermediate said wiping connections and the periphery of the first mentioned bearing member and a dust chamber formed intermediate the wiping connections.

17. In a gyratory crusher, a supporting frame, a crushing head, supporting means therefor supported on said frame, means for gyrating said head, and means for preventing the access of dust to the supporting means, said means including a plurality of wiping connections, an oil sump intermediate said wiping connections each such connection including a member associated with the frame and a member associated with the head, and the supporting means, and a dust chamber formed intermediate the wiping connections.

18. In a gyratory crusher, supporting frame, a crushing head, a bearing member on which said head is slidably mounted, said bearing member being supported by said frame, a plurality of wiping members associated with the head, a plurality of wiping members, associated with said frame, surrounding said bearing member and spaced therefrom, in wiping relationship with the wiping members associated with the head, and a unitary support for said wiping members associated with the frame.

19. The structure of claim 18 characterized by the provision of a dust chamber between said wiping members.

Signed at Hollywood, county of Los Angeles and State of California, this 29th day of April, 1929.

EDGAR B. SYMONS.